(No Model.) 4 Sheets—Sheet 1.
H. NETTELBECK.
EARTH EXCAVATING APPARATUS.
No. 556,513. Patented Mar. 17, 1896.
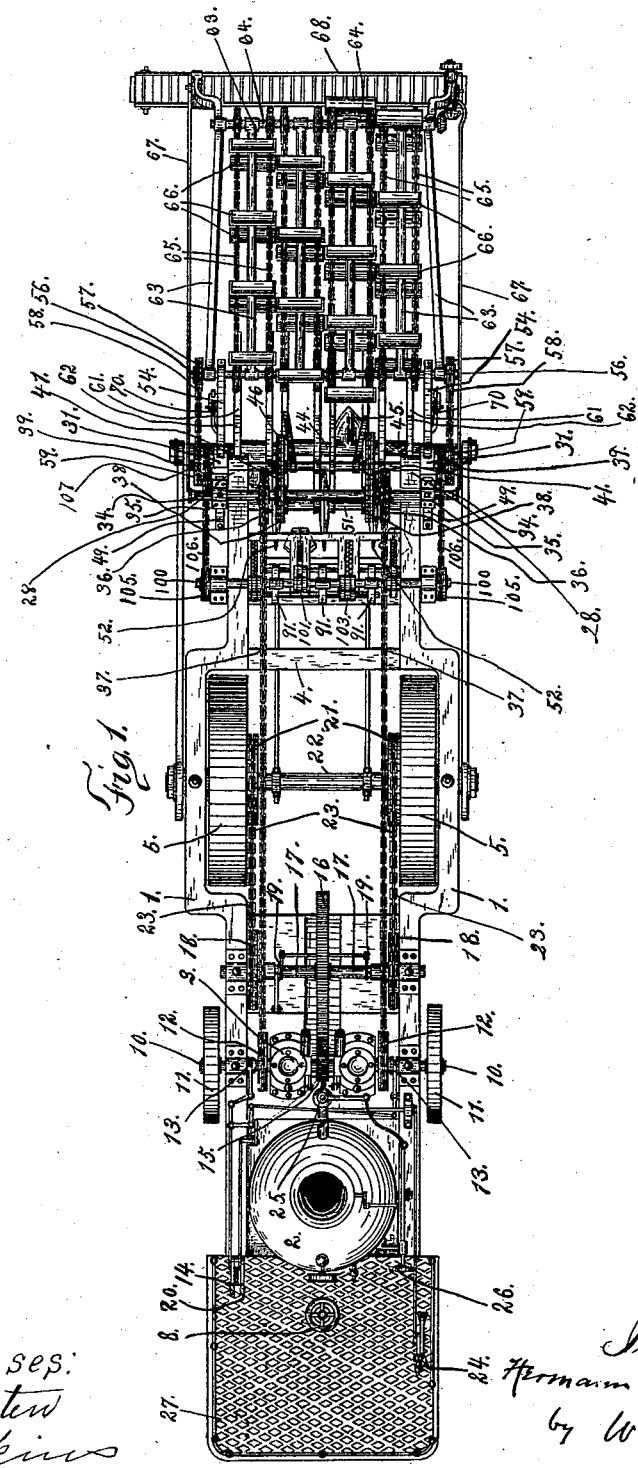
Witnesses:
F. P. Ansten
B. Hopkins
Inventor:
Hermann Nettelbeck
by W. T. Miller
Atty (No Model.) 4 Sheets—Sheet 2.
H. NETTELBECK.
EARTH EXCAVATING APPARATUS.
No. 556,513. Patented Mar. 17, 1896.
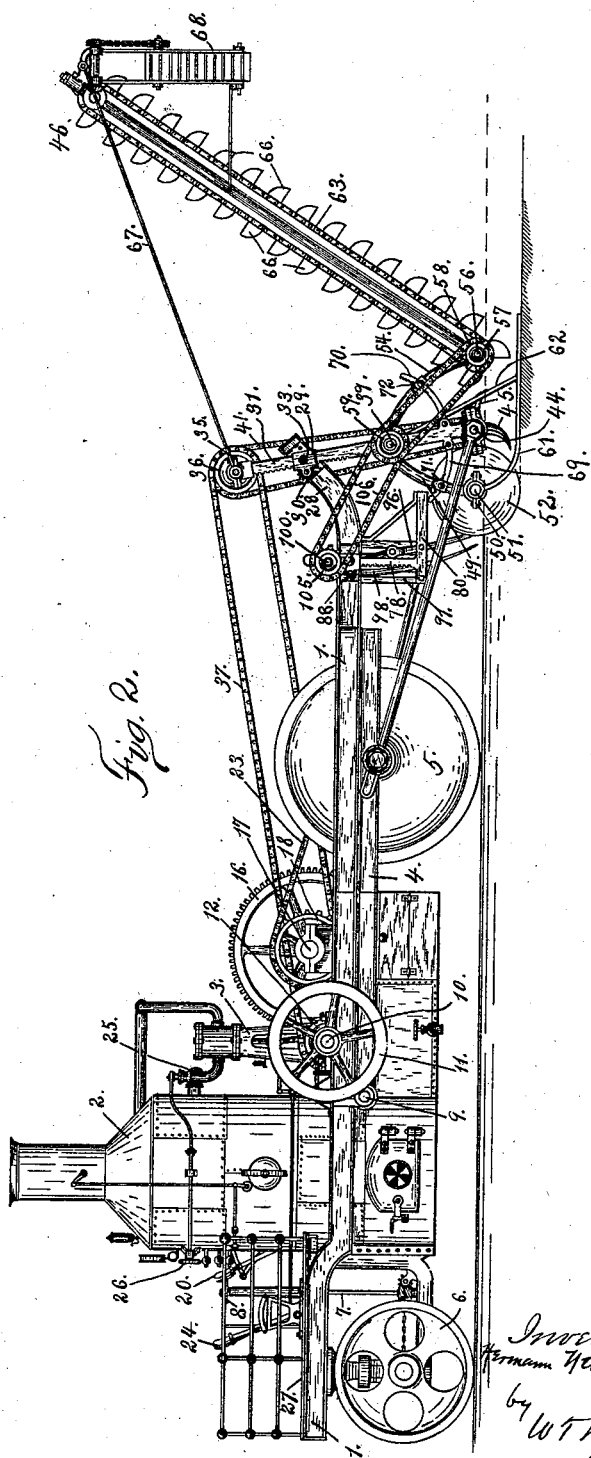

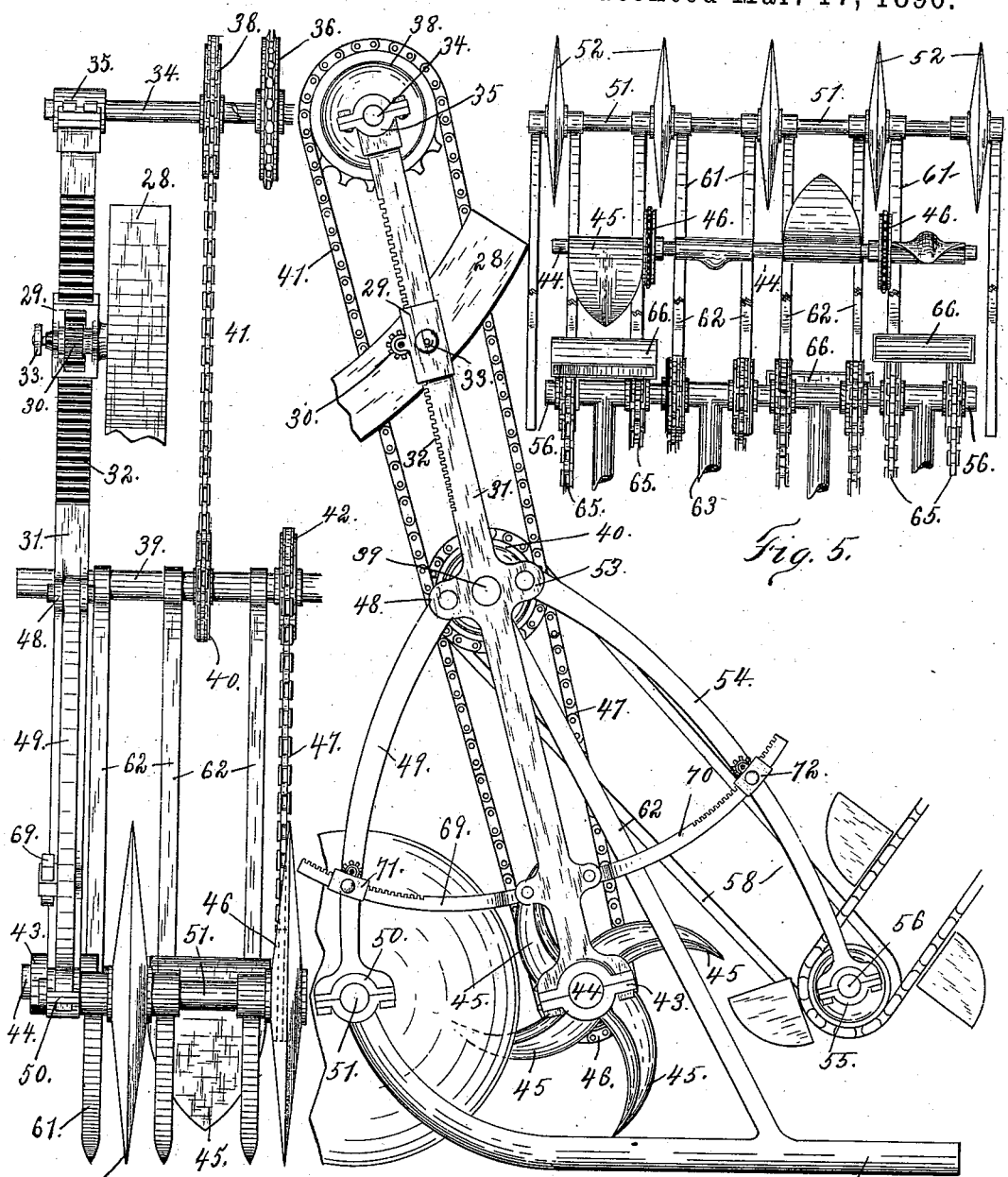

(No Model.) 4 Sheets—Sheet 4.
H. NETTELBECK.
EARTH EXCAVATING APPARATUS.
No. 556,513. Patented Mar. 17, 1896.
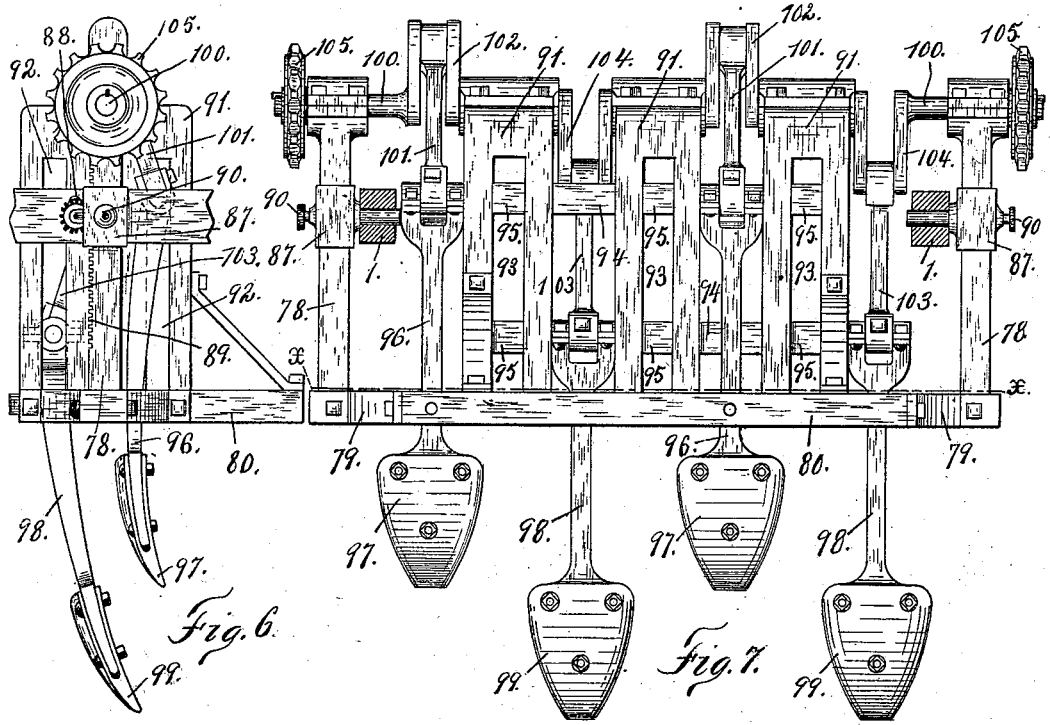
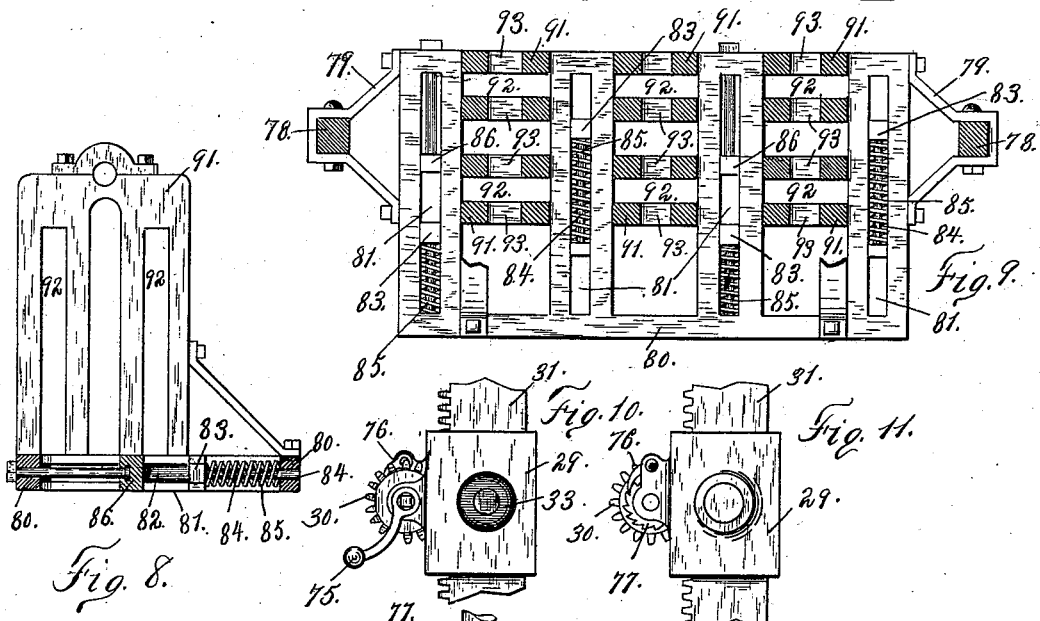
Witnesses:
F. P. Kersted.
B. Hopkins
Inventor.
Hermann Nettelbeck
by W. T. Miller
Atty.

UNITED STATES PATENT OFFICE.

HERMANN NETTELBECK, OF BUFFALO, NEW YORK.

EARTH-EXCAVATING APPARATUS.

SPECIFICATION forming part of Letters Patent No. 556,513, dated March 17, 1896.

Application filed June 6, 1895. Serial No. 551,866. (No model.)

*To all whom it may concern:*

Be it known that I, HERMANN NETTELBECK, a citizen of the United States, residing at Buffalo, in the county of Erie and State of New York, have invented certain new and useful Improvements in Earth-Excavating Apparatus; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in earth-excavating apparatus, and particularly to apparatus specially adapted for excavating earth in streets to prepare a bed for the reception of paving materials.

The object of my invention is to provide an apparatus impelled along the surface to be excavated by a motor mounted upon the carrying-frame, which simultaneously actuates a novel arrangement of mechanism for cutting, loosening, and carrying to one side of the road-bed a layer of earth of any desired thickness.

To that end my invention consists broadly of a carrying-frame mounted upon guiding and traction wheels, a motor upon the carrying-frame for actuating the traction-wheels and operative parts of the excavating apparatus, a series of vertically-mounted disks for vertically cutting the earth longitudinally or in the line of travel, a series of vertically-reciprocating blades operating between the vertical disks to vertically cut the earth transversely of the line of travel and between the longitudinal cuts of the vertical disks, a series of rotating scoops to loosen and throw up the vertically-cut earth, a series of endless bucket-carriers to receive and elevate the loosened earth, and means for carrying the elevated earth to one side of the road-bed.

My invention further consists in mounting the traction-wheels upon a separate frame pivoted to the carrying-frame, in providing for a consecutive cutting contact with the earth of the vertically-reciprocating blades, in adjustably mounting the vertical disks and the endless bucket-carriers in a separate frame vertically adjustable upon the carrying-frame, in providing a vertical adjustment upon the carrying-frame of the frame in which the vertical blades are reciprocated, and in arranging the rotating scoops at different angles upon their shaft for consecutive loosening contact with the earth.

In the drawings, Figure 1 is a top plan view, and Fig. 2 is a side elevation, of my improved excavating apparatus. Fig. 3 is a front elevation showing in detail a portion of the adjustable frame carrying the cutting-disks and revolving scoops. Fig. 4 is a side elevation of the same additionally showing its connection with the endless carrier. Fig. 5 is a detail top plan view of the cutting-disks, revolving scoops, and endless carrier. Fig. 6 is a detail side elevation of the vertically-reciprocating cutters and the frame in which they operate. Fig. 7 is a rear elevation of Fig. 6. Fig. 8 is a detail of the frame shown in Fig. 6. Fig. 9 is a horizontal section of the frame shown in Fig. 7 taken in the line $x\ x$, and Figs. 10, 11, and 12 are detail opposite side and top plan views of a device for adjusting and holding different portions of the frame shown in Figs. 3, 4, 6, and 7.

Referring to the drawings, 1 is the main frame, which carries at its forward end the boiler 2 and upright engine 3. On this main frame are also attached the operative parts of the apparatus. Under this frame is pivoted, at its forward end 9, the shorter frame 4, upon which are mounted the traction-wheels 5. Under the forward end of frame 1 are pivoted the steering-wheels 6, which are turned as desired by the rod 7, its wheel 8, and any well-known connecting devices for the purpose.

Between the frame 1 and the axle on which the steering-wheels 6 are mounted a universal joint should be interposed in order that the level of the main frame may be preserved when the steering-wheels are passing over inequalities in the ground. Any well-known form of universal joint may be employed and for this reason no particular one has been illustrated in the drawings.

10 is a shaft mounted upon the frame 1 under the engine 3 and revolved by the same. Upon its outer projecting ends are rigidly mounted the fly-wheels 11 11. Loosely mounted upon this shaft are the two sprocket-wheels 12 12, which are engaged with and disengaged from the shaft 10 by means of the separate clutches 13 13, operated through intervening connecting rods and levers by the hand-lever 14. Centrally secured to the shaft 10 is the small gear-wheel 15, which intermeshes with the large gear-wheel 16, mounted upon the shaft 17, secured in bearings on the frame 1 and in the rear of shaft 10. Loosely mounted upon shaft 17 and just within the sides of the frame 1 are the sprocket-wheels 18 18, which are engaged with and disengaged from such by the separate clutches 19 19, operated through intervening connecting rods and levers by the hand-lever 20.

Upon the inner faces of the traction-wheels 5 5 are rigidly secured the sprocket-wheels 21 21, the shaft 22, upon which the traction-wheel 5 5 are mounted, passing loosely through both sets of traction and sprocket wheels. The sprocket-chains 23 23 transmit power from the sprocket-wheels 18 18 to the sprocket-wheels 21 21 to impart motion to the traction-wheels 5 5 in moving the apparatus forward or backward, as desired, and entirely independent of any lifting of the carrying-frame to which the frame carrying the traction-wheels is pivoted.

The motion of the engine 3 is reversed by means of the hand-lever 24 and intervening connecting rods and levers, and the throttle 25 is operated by the hand-wheel 26, which, with the hand-levers 14, 20, and 24 and hand-wheel 8 for turning the steering-wheels, is located within easy reach of the operator standing upon the platform 27 upon the forward end of the frame 1.

28 28 are the upwardly-curved arms at the rear end of the frame. Upon the outer faces of these arms 28 28 are pivoted the rectangular casings 29, each provided upon its front face with a small cog-wheel 30. Two side bars 31 are passed loosely through these casings 29 29 and are provided upon their forward edges with teeth 32, which are in adjustable engagement with the cog-wheels 30 in the casings 29. Tightening-screws 33 pass through the sides of the casings for engagement with the side bars 31 to hold them in any desired position in the casings.

34 is a shaft whose ends rest in bearings 35 in the upper ends of the side bars 31. Upon this shaft 34 are rigidly mounted the two sprocket-wheels 36, which are revolved by the sprocket-chains 37 passing around in engagement with the sprocket-wheels 12 12 upon the power-shaft 10 of the engine 3. Upon this same shaft 34 are rigidly mounted the two sprocket-wheels 38 38. Another shaft 39 is mounted in the side bars 31. Upon this shaft 39 are mounted the two sprocket-wheels 40 40, which are connected with the sprocket-wheels 38 38 upon the shaft 34 by the sprocket-chains 41 41. Upon the shaft 39 are also mounted the two sprocket-wheels 42 42. In the bearings 43 in the lower ends of the side bars 31 is journaled the shaft 44, upon which are rigidly arranged a series of scoops 45, preferably four in number and extending in different directions from the shaft, as shown in Fig. 5, so that their contact with the loosened earth will be in consecutive order. Upon this shaft 44 are rigidly mounted two sprocket-wheels 46, which receive their rotary motion from the sprocket-wheels 42 on shaft 39 through the sprocket-chains 47.

Upon the apertured lug 48 on the forward edge of each side bar 31 is pivoted the arm 49, and in the bearings 50 upon the lower ends of these two arms 49 is journaled the shaft 51. Upon this shaft 51 are rigidly secured a series of five disks 52, the peripheries of which are sufficiently sharp to penetrate the ground in a vertical direction. As shown in Fig. 5, the four rotating scoops 45 are so located as to operate between the vertical disks 52 in consecutive order.

On the opposite rear edges of the side bars 31 are the apertured lugs 53, in which are pivoted the upper ends of the arms 54. Upon the lower ends of these arms 54 are bearings 55, in which is journaled the shaft 56. This shaft 56 carries the two sprocket-wheels 57. The sprocket-chains 58 transmit power from the shaft 39 to the shaft 56 by means of the sprocket-wheels 59 on shaft 39 and the sprocket-wheels 60 on shaft 56.

On both sides of each cutting-disk 52 and pivoted to the shaft 51 are the series of runners 61, which curve downwardly from the shaft a short distance and then extend horizontally in a rearward direction.

62 are braces extending from the runners 61, to which they are rigidly secured, to the shaft 39, around which they are pivoted.

63 are a series of braces pivoted at their lower ends to the shaft 56 and at their upper ends to a shaft 64, and form together a frame for supporting a series of endless bucket-carriers, each of which is formed by a pair of sprocket-chains 65, across which buckets 66 are secured at regular intervals. The endless-bucket-carrier frame is adjustably supported at its upper end by the rods or chains 67, which extend across to the ends of the shaft 34. At the upper end of the bucket-carrier frame is arranged a single endless carrier 68, extending from one side of the frame across the same and to a point away from the apparatus. This endless carrier is operated by suitable mechanism from the shaft 64. 69 and 70 are toothed arms pivoted on either side of each of the side arms 31, their outer or free ends being adjustably engaged in the sockets 71 and 72, pivoted upon the arms 49 and 54 which carry the shafts 51 and 56, by means of which the height of the cutting-disks and endless bucket-carriers can be adjusted.

The sockets 71 and 72 are constructed and operate in the same manner as the socket 29 and its attachments. (Shown in Figs. 10, 11, and 12.) In such figures the socket 29 is provided with the interior central rib 73, which rides in the groove 74 in the side bar 31. The cog-wheel 30 is turned to raise or lower the side bar 31 by a removable crank 75. A dog 76 engaging with the ratchet-wheel 77, rigid with the cog-wheel 30, serves to temporarily hold the side bar 31 until it can be securely clamped by the screw 33. Of the vertically-adjustable frame for carrying the reciprocating cutters, 78 78 are the side uprights the lower ends of which are bolted to the iron brackets 79 79, secured to the sides of the main body of the frame. This main body is composed of the lower horizontal rectangular framework 80, in which are arranged the four vertical elongated slots 81, in the longer interior side walls of which are the grooves 82. (See Fig. 8.) In these slots 81 are arranged spring-pressed guides or keepers consisting of the heads 83 having shanks 84 surrounded by spiral springs 85, which press against the heads 83, the shanks 84 passing loosely through the adjustable blocks 86, rigidly secured in the slots 81, and through the end piece of the frame 80, as illustrated in section in Fig. 8. The side uprights 78 78 pass through rectangular sockets 87, pivoted to the carrying-frame 1 on each side, and are provided with the attached cog-wheels 88, which engage with the teeth 89 on one edge of the uprights 78 78 for adjusting the same in the sockets 88, the clamping-screws 90 securing them in any adjusted position, as required, in the same manner as with the sockets shown in Figs. 10, 11, and 12.

91 91 91 are a series of three intermediate uprights secured at their lower ends in the horizontal framework 80, each provided with two elongated transverse slots 92 92, from which lead the short cross-slots 93. Two cross-beams 94 94 pass loosely through each set of the three slots 92 and are provided on each side with the lugs 95, which travel vertically in the cross-slots 93 93. To the forward cross-beam 94 are pivoted the two shanks 96, carrying on their lower ends the cutting-blade 97. To the rear cross-beam 94 are similarly secured the two shanks 98, carrying the cutting-blades 99, the four blades being so arranged as to cut in different planes, as shown in Fig. 7. Across the upper ends of the side uprights, 78, and the intermediate uprights, 91, is journaled the shaft 100. The cross-beam 95 is connected to this shaft 100 by the pitman-rods 101, pivoted at their lower ends to the cross-beam 95 and at their upper ends to the crank-arms 102 on the shaft 100. The cross-beam 94 is connected to the same shaft by the pitman-rods 103, pivoted at their lower ends to the crank-arms 104 on the shaft 100, which is provided outside the uprights 78 with the rigid sprocket-wheels 105. The shaft 100 is revolved by the sprocket-chains 106, (see Figs. 1 and 2,) which engage with the sprocket-wheels 105 on shaft 100 and sprocket-wheels 107 on the shaft 39, journaled in the side bars 31. The four vertically-reciprocating cutters 97 97 and 99 99 operate upon the earth between the forward edges of the vertical cutting-disks.

It will be seen from the foregoing description of my improved apparatus that the principle upon which it operates is to separate the earth vertically in a series of cuts in the line of travel by means of the vertical revolving disks and to vertically separate it at intervals transversely of the line of travel by means of the vertically-reciprocating cutting-blades, which operate between the vertical disks, after which it is completely separated by the revolving scoops and is in a condition to be caught up by the buckets on the endless carriers and conveyed away from the line of travel.

My apparatus is specially designed for excavating the road-bed of a street to be paved, and is adjusted for its work and operated substantially as follows: The depth of the layer of earth to be excavated having been determined, the side bars 31, carrying the scoops 45, are lowered to the required position in their sockets 29 upon the carrying-frame 1, after which the relative positions of the vertical disks 51 and the lower ends of the endless bucket-carriers are separately adjusted, as shown in Fig. 4. The proper operative position of the vertically-reciprocating cutters is next fixed by adjusting the uprights 78 in their sockets 87 upon the carrying-frame 1. The engine being started, motion is communicated as described to the traction-wheels 5 and the apparatus is moved forward at the proper speed. At the same time the operative parts of the apparatus are set in motion. The vertical disks, by reason of the weight pressing upon them and their own revolution, cut into the road-bed in longitudinal lines, severing the earth to the desired depth, and the vertically-reciprocating cutters 77 79, acting in pairs alternately, cut into the earth transversely at regular intervals across between the longitudinal cuts. The revolving scoops 45, acting consecutively, loosen and lift the previously-cut earth, and the revolving buckets following in their wake receive the loosened and thrown-up earth and elevate the same to the cross-carrier 68, which conveys it to the side of the apparatus, where it is dumped into wagons or otherwise received for removal.

The object of mounting the traction-wheels 5 in a separate frame 4 pivoted to the carrying-frame 1 is that in the event of the rear end of the apparatus being lifted up in passing over an obstruction in its path, such as a large stone, the traction-wheels are permitted to retain their contact with the ground, so as to pull the apparatus over and beyond the obstruction; otherwise, if the traction-wheels were mounted directly in the carrying-frame, they would, in the event of the rear end of the apparatus being lifted up by an obstruction, also rise and remain clear of the ground at the very instant that their traction power was absolutely necessary to pull the apparatus completely over and beyond the obstruction. When such an obstruction is encountered the runners 61, extending across the apparatus, lift the same above such obstruction and thereby prevent injurious contact therewith, thus serving in the double capacity of a support and guard, the runners being so distributed across the apparatus as to permit an unobstructed action of the disks, scoops, and buckets.

The shanks 96 98 of the vertically-reciprocating cutters 97 99, it will be observed, pass down through the slots 81 (see Fig. 9) in contact with the spring-pressed guides or keepers 83, which serve the double purpose of directing the vertical movement of the cutters and permitting them to be deflected on striking a stone or other obstruction, thereby insuring them against breakage. After deflection they are returned to their normal vertical path by the action of the springs 85. The starting and stopping of the apparatus and the reversing of the line of travel are all controlled by the operator from the platform, and the operative parts can be thrown in or out of movement independent of the travel of the carrying-frame by means of the hand-lever 14 and attached mechanism.

When the apparatus is being moved to or from its place of operation the disks, scoops, buckets, and vertically-reciprocating cutters can all be quickly raised clear of contact with the ground and as quickly lowered for operative contact with the same.

It is not absolutely essential that the cutters 97 99 be operated in the manner shown, as a substantially similar effect might be produced by cutters differently arranged and without departing from the spirit of my invention.

I have herein shown the vertically-reciprocating cutters, the rotating scoops, and the endless bucket-carriers in series of four each and the vertical disks in a series of five, but do not wish to be confined to these numbers, as a less number might be employed, or they might be duplicated within certain limits in order to vary the width of the excavation, and the apparatus could be equally well employed in excavations other than for street-paving.

I claim—

1. An earth-excavating apparatus consisting of a carrying-frame mounted upon guiding and traction wheels, a motor upon the carrying-frame for actuating the traction-wheels and operative parts, a series of cutters for vertically severing the earth longitudinally or in the line of travel, a series of cutters for severing the earth at intervals transversely of the line of travel, a series of scoops for loosening and throwing up the vertically-cut earth and means for removing the dislodged earth from the path of the apparatus.

2. An earth-excavating apparatus consisting of a carrying-frame mounted upon guiding and traction wheels, the traction-wheels being mounted in a separate frame pivoted to the carrying-frame, a motor upon the carrying-frame for actuating the traction-wheels and operative parts, a series of cutters for vertically severing the earth longitudinally or in the line of travel, a series of scoops for loosening and throwing up the vertically-cut earth and means for removing the dislodged earth from the path of the apparatus.

3. An earth-excavating apparatus consisting of a carrying-frame mounted upon guiding and traction wheels, the traction-wheels being mounted in a separate frame pivoted to the carrying-frame, a motor upon the carrying-frame for actuating the traction-wheels and operative parts, a series of cutters for vertically severing the earth longitudinally or in the line of travel, a series of cutters at intervals transversely of the line of travel, a series of scoops for loosening and throwing up the vertically-cut earth and means for removing the dislodged earth from the path of the apparatus.

4. An earth-excavating apparatus consisting of a carrying-frame mounted upon guiding and traction wheels, a motor upon the carrying-frame for actuating the traction-wheels and operative parts, a series of vertically-mounted disks for vertically cutting the earth longitudinally or in the line of travel a series of cutters for severing the earth at intervals transversely of the line of travel, a series of scoops for loosening and throwing up the vertically-cut earth and means for removing the dislodged earth from the path of the apparatus.

5. An earth-excavating apparatus consisting of a carrying-frame mounted upon guiding and traction wheels, the traction-wheels being mounted in a separate frame pivoted to the carrying-frame a motor upon the carrying-frame for actuating the traction-wheels and operative parts, a series of vertically-mounted disks for vertically cutting the earth longitudinally or in the line of travel, a series of cutters for severing the earth at intervals transversely of the line of travel, a series of scoops for loosening and throwing up the vertically-cut earth and means for removing the dislodged earth from the path of the apparatus.

6. An earth-excavating apparatus consisting of a carrying-frame mounted upon guiding and traction wheels, a motor upon the carrying-frame for actuating the traction-wheels and operative parts, a series of vertically-mounted disks for vertically cutting the earth longitudinally or in the line of travel, a series of vertically-reciprocating cutters for severing the earth at intervals transversely of the line of travel, a series of scoops for loosening and throwing up the vertically-cut earth and means for removing the dislodged earth from the path of the apparatus.

7. An earth-excavating apparatus consisting of a carrying-frame mounted upon guiding and traction wheels, the traction-wheels being mounted in a separate frame pivoted to the carrying-frame a motor upon the carrying-frame for actuating the traction-wheels and operative parts, a series of vertically-mounted disks for vertically cutting the earth longitudinally or in the line of travel, a series of vertically-reciprocating cutters for severing the earth at intervals transversely of the line of travel a series of scoops for loosening and throwing up the vertically-cut earth and means for removing the dislodged earth from the path of the apparatus.

8. An earth-excavating apparatus consisting of a carrying-frame mounted upon guiding and traction wheels, a motor upon the carrying-frame for actuating the traction-wheels and operative parts, a series of vertically-mounted disks for vertically cutting the earth longitudinally or in the line of travel, a series of vertically-reciprocating cutters for severing the earth at intervals transversely of the line of travel, a series of rotating scoops mounted at different angles upon their shaft for consecutive loosening contact with the earth and means for removing the dislodged earth from the path of the apparatus.

9. An earth-excavating apparatus consisting of a carrying-frame mounted upon guiding and traction wheels, the traction-wheels being mounted upon a separate frame pivoted to the carrying-frame, a motor upon the carrying-frame for actuating the traction-wheels and operative parts, a series of vertically-mounted disks for vertically cutting the earth longitudinally or in the line of travel, a series of vertically-reciprocating cutters for severing the earth at intervals transversely of the line of travel, a series of rotating scoops mounted at different angles upon their shaft for consecutive loosening contact with the earth and means for removing the dislodged earth from the path of the apparatus.

10. An earth-excavating apparatus consisting of a carrying-frame mounted upon guiding and traction wheels, a motor upon the carrying-frame for actuating the traction-wheels and operative parts, a series of vertically-mounted disks for vertically cutting the earth longitudinally or in the line of travel, a series of vertically-reciprocating cutters for severing the earth at intervals transversely of the line of travel, a series of rotating scoops mounted at different angles upon their shaft for consecutive loosening contact with the earth, a series of endless bucket-carriers for raising the dislodged earth and an endless carrier for conveying the earth from the path of the apparatus.

11. An earth-excavating apparatus consisting of a carrying-frame mounted upon guiding and traction wheels the traction-wheels being mounted upon a separate frame pivoted to the carrying-frame, a motor upon the carrying-frame for actuating the traction-wheels and operative parts, a series of vertically-mounted disks for vertically cutting the earth longitudinally or in the line of travel, a series of vertically-reciprocating cutters for severing the earth at intervals transversely of the line of travel, a series of rotating scoops mounted at different angles upon their shaft for consecutive loosening contact with the earth, a series of endless bucket-carriers for raising the dislodged earth and an endless carrier for conveying the earth from the path of the apparatus.

12. In an earth-excavating apparatus the combination with the vertical cutting-disks and the endless bucket-carriers adjustably mounted upon a frame which is adjustably secured to the carrying-frame of a series of runners loosely pivoted to the shaft of the cutting-disks and to a shaft upon the frame for protecting the buckets upon their endless carriers.

13. An earth-excavating apparatus consisting of a carrying-frame mounted upon guiding and traction wheels, a motor upon the carrying-frame for actuating the traction-wheels and operative parts, a series of vertically-mounted cutting-disks for vertically cutting the earth longitudinally or in the line of travel a series of vertically-reciprocating cutters for severing the earth at intervals transversely of the line of travel, a series of rotating scoops mounted at different angles upon their shaft for consecutive loosening contact with the earth and a series of endless bucket-carriers for raising the dislodged earth, the vertical cutting-disks and the endless bucket-carriers being adjustably mounted upon a frame which is vertically adjustable upon the carrying-frame.

14. An earth-excavating apparatus consisting of a carrying-frame mounted upon guiding and traction wheels, a motor upon the carrying-frame for actuating the traction-wheels and operative parts, a series of vertically-mounted disks for vertically cutting the earth longitudinally or in the line of travel, a series of vertically and consecutively reciprocating cutters, mounted in a frame which is vertically adjustable upon the carrying-frame, for severing the earth at intervals transversely of the line of travel, a series of scoops for loosening and throwing up the vertically-cut earth and means for removing the dislodged earth from the path of the apparatus.

15. An earth-excavating apparatus consisting of a carrying-frame mounted upon guiding and traction wheels, a motor upon the carrying-frame for actuating the traction-wheels and operative parts, a series of vertically-mounted disks for vertically cutting the earth longitudinally or in the line of travel, a series of vertically-reciprocating cutters mounted in a frame which is vertically adjustable upon the carrying-frame yielding guides in such frame which direct the vertical movement of the cutters and permit them to deflect on striking an obstruction, a series of scoops for loosening and throwing up the vertically-cut earth and means for removing the dislodged earth from the path of the apparatus.

16. An earth-excavating apparatus consisting of a carrying-frame mounted upon guiding and traction-wheels, a motor upon the carrying-frame for actuating the traction-wheels and operative parts, a series of vertically-mounted disks for vertically cutting the earth longitudinally or in the line of travel, a series of vertically and consecutively reciprocating cutters mounted in a frame which is vertically adjustable upon the carrying-frame, yielding guides in such frame which direct the vertical movement of the cutters and permit them to deflect on striking an obstruction, a series of scoops for loosening and throwing up the vertically-cut earth and means for removing the dislodged earth from the path of the apparatus.

In testimony whereof I have signed my name to this specification in the presence of two subscribing witnesses.

HERMANN NETTELBECK.

Witnesses:
W. T. MILLER,
I. P. KERSTEN.